United States Patent
Akinwande et al.

(10) Patent No.: US 9,388,916 B2
(45) Date of Patent: Jul. 12, 2016

(54) SINGLE-USE, PERMANENTLY-SEALABLE MICROVALVE

(75) Inventors: Akintunde I. Akinwande, Newton, MA (US); Carol Livermore-Clifford, Framingham, MA (US); Martin A. Schmidt, Reading, MA (US); Aalap S. Dighe, Cambridge, MA (US); Luis Fernando Velásquez-García, Newton, MA (US)

(73) Assignee: MASSACHUSETTS INSTITUTE OF TECHNOLOGY, Cambridge, MA (US)

( * ) Notice: Subject to any disclaimer, the term of this patent is extended or adjusted under 35 U.S.C. 154(b) by 606 days.

(21) Appl. No.: 13/307,665

(22) Filed: Nov. 30, 2011

(65) Prior Publication Data

US 2013/0133757 A1    May 30, 2013

(51) Int. Cl.
*F16K 17/40* (2006.01)
*F16K 99/00* (2006.01)

(52) U.S. Cl.
CPC ........... *F16K 99/003* (2013.01); *F16K 99/0044* (2013.01); *Y10T 29/49412* (2015.01); *Y10T 137/1812* (2015.04)

(58) Field of Classification Search
CPC .............. F16K 99/003; F16K 99/0044; Y10T 29/49412; Y10T 137/1812
USPC ........ 17/67, 74, 76; 251/11; 137/67, 74, 76, 1
See application file for complete search history.

(56) References Cited

U.S. PATENT DOCUMENTS

| | | | |
|---|---|---|---|
| 6,102,897 A | * | 8/2000 | Lang .............................. 604/246 |
| 7,175,772 B2 | * | 2/2007 | Eldridge ........................... 216/2 |
| 7,413,412 B2 | | 8/2008 | Govyandinov et al. |
| 2008/0265192 A1 | | 10/2008 | Stenmark et al. |
| 2009/0001303 A1 | | 1/2009 | Bejhed et al. |

FOREIGN PATENT DOCUMENTS

| | | |
|---|---|---|
| EP | 1267385 A1 | 12/2002 |
| EP | 1403903 A2 | 3/2004 |
| EP | 1941197 | 7/2009 |
| WO | 2007040455 A1 | 4/2007 |
| WO | 2007078250 A1 | 7/2007 |
| WO | 2010141338 A2 | 12/2010 |

OTHER PUBLICATIONS

Dighe "Thermally Actuated MEMS Seal for Vacuum Applications" Sep. 2011, pp. 1-171.

(Continued)

*Primary Examiner* — Kevin Lee
*Assistant Examiner* — P. Macade Nichols
(74) *Attorney, Agent, or Firm* — Gesmer Updegrove LLP

(57) ABSTRACT

A microvalve device is provided that includes a through via located in an island structure supported on a thermally-insulating membrane supported by a frame. The through via is surrounded by a meltable sealing material. A heater element is positioned on the island structure for sealing the material over the through via by heating the sealing material.

18 Claims, 3 Drawing Sheets

TOP VIEW

(56) References Cited

OTHER PUBLICATIONS

Koops, "A miniaturized Orbitron pump for MEMS applications" IEEE at least by Dec. 2005, pp. 364-365.
NASA Tech Briefs, "Miniature Lightweight Ion Pump" Mar. 1, 2010, 1 page.
Koops, Proposal of a miniaturized Orbitron pump for MEMS applications, Proc. of SPIE, vol. 5838, at least by Dec. 2005, pp. 38-42.
Wright et al., "A Micromachined Titanium Sputter Ion Pump For Cavity Pressure Control" MEMS Jan. 2006, pp. 754-757.
Vesel, "XPS Study of the deposited Ti layer in a magnetron-type sputter ion pump" Applied Surface Science at least by Dec. 2006, pp. 2941-2946.
Dec. 2010 DARPA Sponsor Meeting, 25 pages.
Materials from DARPA MEMS PI Meeting, Jul. 2009, 11 pages.
Jan. 2011, MTL Annual Research Conference (MIT Conference), 4 pages.
DARPA MEMS PI Meeting (Sponsor Meeting) Jul. 2010, 14 pages.
Sponsor Meeting, Nov. 2009, 2 pages.

\* cited by examiner

SINGLE-USE, PERMANENTLY-SEALABLE MICROVALVE

This invention was made with government support under Grant Nos. W911QY-05-1-0002 and W31P4Q-10-1-0005 awarded by the U.S. Army. The government has certain rights in this invention.

BACKGROUND OF THE INVENTION

The invention is related to the field of microvalves, and in particular to a single-use, permanently sealable microvalve.

A microvalve system is a system that includes a valve that is physically small, having features with sizes in the micrometer range. Most microvalves are MicroElectroMechanical System (MEMS) devices. MEMS is a class of systems that are physically small, having features with sizes in the micrometer range. Most MEMS relate in general to semiconductor electromechanical devices. These systems typically have both electrical and mechanical components, although some MEMS devices have entirely or predominantly thermal or fluidic components. The term "micromachining" is commonly understood to mean the production of three-dimensional structures and moving parts of MEMS devices. MEMS originally used modified integrated circuit (computer chip) fabrication techniques (such as chemical etching) and materials (such as silicon semiconductor material) to micromachine these very small mechanical devices. Today there are many more micromachining techniques and materials available. The term "microvalve" as used in this application means a valve having features with sizes in the micrometer range. Microvalves are thus typically formed by micromachining. The term "microvalve device" as used in this application means a device that includes a microvalve, and that may include other components. It should be noted that if components other than a microvalve are included in the microvalve device, these other components may be micromachined components or components fabricated using standard fabrication methods, i.e. sized larger.

SUMMARY OF THE INVENTION

According to one aspect of the invention, there is provided a microvalve device. The microvalve device includes an island structure that includes a through via located in the island structure supported on a thermally-insulating membrane supported by a frame. The through via is surrounded by a meltable sealing material. A heater element is positioned on the island structure for sealing the material over the through via by heating the sealing material.

According to another aspect of the invention, there is provided a method of forming a single-use permanently sealable microvalve. The method includes forming an island structure that includes a through via located in the island structure supported on a thermally-insulating membrane supported by a frame. The through via is surrounded by a meltable sealing material. Also, the method includes positioning a heater element on the island structure for sealing the material over the through via by heating the sealing material.

DETAILED DESCRIPTION OF THE INVENTION

In accordance with one embodiment of the invention there is provided a substantially leak-free, permanently sealable, single-use microvalve. Its operation is as follows. The microvalve begins in an open state, enabling high flow rates through its throughway. The microvalve is then actuated to close, forming a permanent, substantially leak-free seal. Such a microvalve can be used for example in vacuum applications or to seal in the contents of a closed space and to prevent entry into that space by molecules or atoms from outside the closed space. This device is different from existing microvalves in that it is substantially leak-free in the closed state and has a relatively high flow rate in the open state.

The inventive microvalve relies on the surface tension of a molten seal material to establish a permanent seal over its initially-open port upon heating. The sealable port is a throughway located in an island structure supported on a thermally-insulating membrane supported by a frame. The throughway is surrounded by a ring of meltable sealing material. The invention also includes a heater to seal the material over the throughway, the sealing material is heated by the heater. For example, the back side of the island is heated by passing a current through it. Various kinds of heaters can be used in the invention. Upon thermal actuation, the hollow cylinder of sealing material reflows into a toroid due to surface tension. For sufficiently high sealing material aspect ratios, the inner edges of the toroid meet in the center, thereby plugging the via. The sealing material continues to reflow due to surface tension after the inner edges meet in the center. The continued reflow changes the shape of the seal material without affecting the operation of the seal. The heater is then turned off, solidifying the sealing material and forming a permanent seal.

Figure 1A:
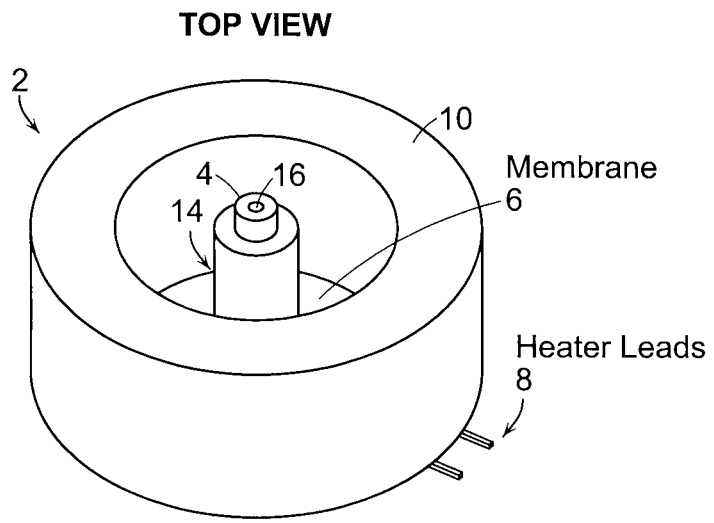
FIGS. 1A-1C are schematic diagrams illustrating a top view, bottom view, and cross section view of the inventive microvalve.
Figure 1B:
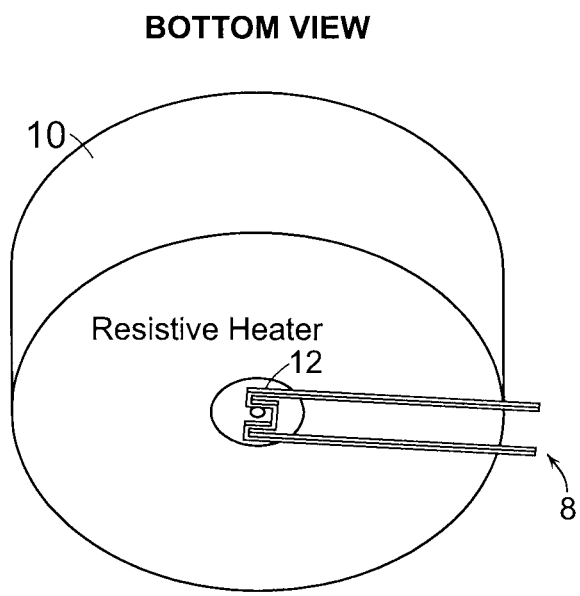
Figure 1C:
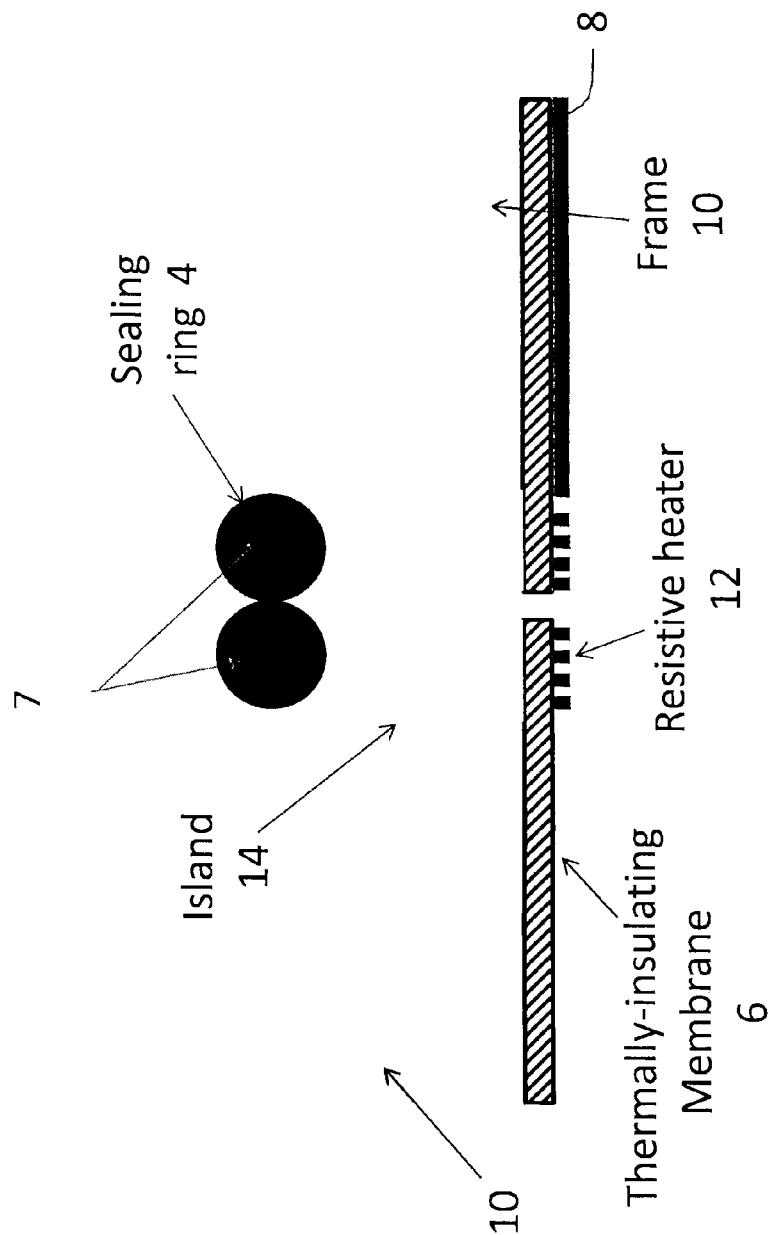

An exemplary embodiment of a single-sealing microvalve structure is shown in FIGS. 1A-1C. The single-sealing microvalve structure 2 relies on the surface tension of a molten seal material to establish a permanent seal over its initially-open port upon heating. The sealable port is a through via 16 located in the center of an isolated island structure 14 supported on a thermally-insulating membrane 6 in a frame 10, as shown in FIG. 1A. The through via 16 is surrounded by a ring of sealing material 4 that has a sufficiently high aspect ratio to ensure that when it melts, the inner edges of the solder ring will meet. To seal the material 4 over the through via 16, the island structure 14 and sealing material 4 are heated. For example, heat can be applied by passing a current through a resistive heater 12 using heater leads 8 on the back side of the microvalve 2, as shown in FIG. 1B. Note in other embodiments of the invention other heating elements can be used to heat the sealing material. Upon thermal actuation, the hollow cylindrically-shaped seal material 4 reflows into a toroid due to surface tension having inner edges 7, as shown in FIG. 1C. It is necessary that the seal material 4 be located on top of an underlying layer that it can "wet" (i.e. it must have a lyophilic interaction with the substrate directly beneath it). It is also necessary that the seal material 4 not have a wetting interaction with the surrounding substrate (i.e. it must have a lyophobic interaction with the surrounding substrate), because this would drive the seal to spread out upon melting rather than forming a rounded shape. With a sufficiently high seal material aspect ratio and a sufficiently small via diameter, the seal material 4 meets across the middle of the ring and plugs the through via 16. The heater 12 is then turned off, solidifying the seal material 4 and forming a permanent seal.

There are many material choices that could be used for the single use sealing microvalve, and there are multiple manufacturing options. A preferred embodiment employs MEMS manufacturing. For the case of MEMS manufacturing, a preferred material for the frame 10 and island structure 14 is silicon because of its easy manufacturability, for example by deep reactive ion etching or KOH etching. However, the frame 10 and island structure can also be made of other materials including, but not limited to silicon carbide, glass, or metal. A preferred material for the thermally-isolating membrane 6 in the case of MEMS manufacturing is either silicon nitride or a multi-layer structure of silicon nitride and silicon oxide. However, the thermally-isolating membrane 6 can also be made of any material (silicon, metals, semiconductors, dielectrics) that provides adequate strength and thermal isolation for valve actuation.

In accordance with an exemplary embodiment of the invention, a preferable dimension of the diameter of the island structure 14 is between 2 mm and 3 mm. The frame 10 can have an inner diameter between 3 mm and 4 mm. The seal material 4 can have an aspect ratio approximately equal to 1:1. The diameter of the through via 16 can be approximately 400 micrometers.

A preferred material for the seal material 4 is indium because of its low melting point (which allows it to melt with a small temperature rise) and its low vapor pressure (which helps prevent outgassing from the seal). However, other seal materials can be used, such as other solders or thermoplastic polymers. A preferred type of heater 12 is a resistive heater. A range of materials can be used to create the resistive heater, including but not limited to gold, nickel, other metals, and polysilicon. There are a wide range of dimensions that can be used to create a functional microvalve.

It is important to note that the flow resistance of the open valve should be low enough that it does not impede the operation of the rest of the microvalve 2. Also, the size of the microvalve 2 should be consistent with microsystem size scales (cubic millimeters to ~1 cubic centimeter). In addition, the flow resistance of the closed valve should be extremely high. For example, for the pumping application, the flow rate should be less than $10^{-9}$ sccm when a pressure difference of 1 atmosphere is applied across the microvalve 2.

One application of sealing microvalves is microscale vacuum systems. The following describes how micropumps (displacement pumps and ion pumps) may be integrated into a system that also contains single-use, permanent sealing microvalves.

Figure 2:
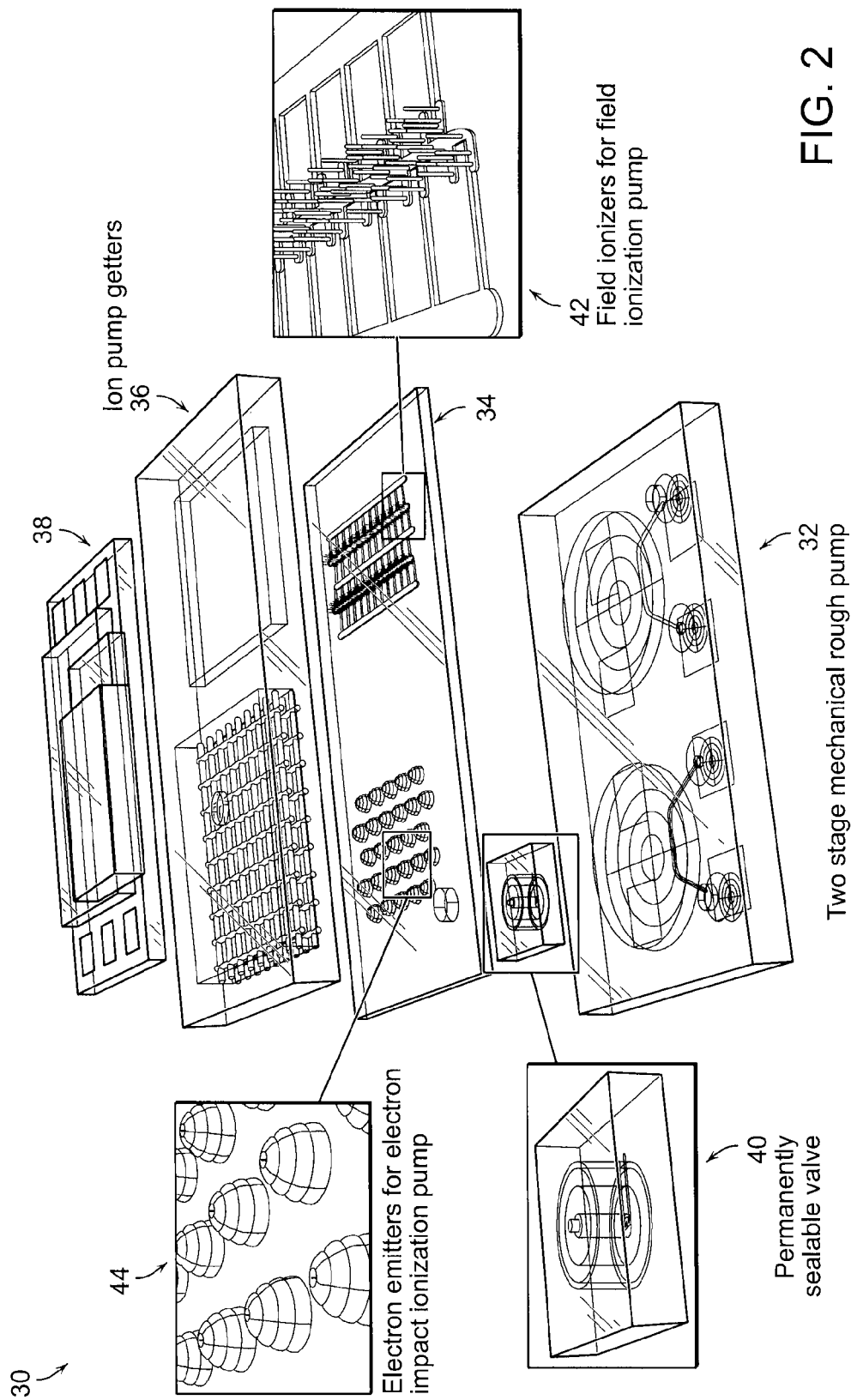
FIG. 2 is a schematic diagram of the micro pump that uses the inventive microvalve.

One solution to microscale vacuum pumping involves a three stage pump 30 shown FIG. 2, with the first stage 32 having a mechanical flow-through pump and the second and third stages 34 having sealed ion pumps 42, 44. The mechanical pump 32 is designed to reduce the chamber pressure from atmosphere (760 Torr) to about 10-30 Torr, at which point the ion pumps 34 are turned on and reduce the pressure from 10-30 Torr to approximately $10^{-6}$ Torr.

The ion pumps 34 serve to ionize the remaining molecules in the chamber and capture them with a "getter" 36, a material held at an opposite potential compared to the ionized molecules. One of the ion pumps 44 uses electron emitters to produce electrons to ionize the residual atoms and molecules through fragmentation, while the other 42 uses field ionizers to ionize the residual atoms and molecules directly. The captured ions then diffuse out from the getter 36 surface into its interior. Because the getters 36 have only a finite surface area for capturing ions as well as a finite volume for storing these ions, they have a finite capacity and lifetime before regeneration or replacement of the getter material.

This lifetime is adversely affected by any leakage into the chamber that is being maintained at a low pressure 38, as leakage increases the number of ions that must be captured by the getters 36 in order to maintain a low pressure. Models indicate that a leakage of $10^{-9}$ sccm (standard cm$^3$ per minute) would allow the getters 36 to run continuously for approximately one year before the getters 36 are saturated. This leakage is much lower than the leakage of the mechanical valves used in the mechanical pump 32. This necessitates using the inventive microvalve 40 between the mechanical pump 32 and the ion pumps 34 that is closed immediately before the ion pumps are turned on, and that has a leakage of less than $10^{-9}$ sccm. The microvalve 40 is permanently sealed to minimize ion leakage and maintain the appropriate vacuum conditions.

In other embodiments of the invention, the microvalve can be applied in microfluidic systems to control microfluidic flows or provide a permanent seal.

The invention provides a substantially leak-free, permanently sealable, single-use microvalve. The microvalve can be used for example in vacuum applications or to seal in the contents of a closed space and to prevent entry into that space by other atoms and/or molecules, thus, allowing the invention to be used in many applications. Also, the microvalve does not require using extraneous techniques or procedures to form.

Although the present invention has been shown and described with respect to several preferred embodiments thereof, various changes, omissions and additions to the form and detail thereof, may be made therein, without departing from the spirit and scope of the invention.

What is claimed is:

1. A microvalve device comprising:
    an island structure that includes a throughway located in the island structure supported on a thermally-insulating membrane supported by a frame, the throughway is surrounded by a meltable sealing material on the island structure, the meltable sealing material includes a hollow cylindrical shape that surrounds the throughway having an aspect ratio to ensure upon thermal actuation the meltable sealing material reflows into a toroid due to surface tension; and
    a heater element that is positioned underneath the island structure for sealing the material over the throughway by heating the sealing material, the sealing material prohibits a wetting interaction with an outer surface of the island structure driving a seal to spread towards the throughway upon melting, wherein inner edges of the toroid meet to thereby plug the throughway.

2. The microvalve device of claim 1, wherein the thermally-insulating membrane comprises silicon nitride or a multi-layer structure of silicon nitride and silicon oxide.

3. The microvalve device of claim 1, wherein the island structure comprises silicon, silicon carbide, glass, or metal.

4. The microvalve device of claim 1, wherein the island structure comprises a diameter between 2 mm and 3 mm.

5. The microvalve device of claim 1, wherein the frame comprises silicon, silicon carbide, glass, or metal.

6. The microvalve device of claim 5, wherein the frame comprises an inner diameter between 3 mm and 4 mm.

7. The microvalve device of claim 1, wherein the meltable sealing material comprises indium, soldering materials, or thermoplastic polymers.

8. The microvalve device of claim 7, wherein the meltable sealing material comprises an aspect ratio approximately equal to or greater than 1:1.

9. The microvalve device of claim 1, wherein the heater element comprises a resistive heating element.

10. A method of forming a single-use microvalve structure comprising:
    forming an island structure that includes a throughway located in the island structure supported on a thermally-insulating membrane supported by a frame, the throughway is surrounded by a meltable sealing material on the island structure, the meltable sealing material includes a hollow cylindrical shape that surrounds the throughway having an aspect ratio to ensure upon thermal actuation the meltable sealing material reflows into a toroid due to surface tension; and
    positioning a heater element underneath the island structure for sealing the material over the throughway by heating the sealing material, the sealing material prohibits a wetting interaction with an outer surface of the island structure driving a seal to spread towards the throughway upon melting, wherein inner edges of the toroid meet to thereby plug the throughway.

11. The method of claim 10, wherein the thermally-insulating membrane comprises silicon nitride or a multi-layer structure of silicon nitride and silicon oxide.

12. The method of claim 10, wherein the island structure comprises silicon, silicon carbide, glass, or metal.

13. The method of claim 12, wherein the island structure comprises a diameter between 2 mm and 3 mm.

14. The method of claim 10, wherein the frame comprises silicon, silicon carbide, glass, or metal.

15. The method of claim 14, wherein the frame comprises an inner diameter between 3 mm and 4 mm.

16. The method of claim 10, wherein the meltable sealing material comprises indium, soldering materials, or thermoplastic polymers.

17. The method of claim 16, wherein the meltable sealing material comprises an aspect ratio approximately equal to or greater than 1:1.

18. The method of claim 10, wherein the heater elements comprises a resistive heating element.

* * * * *